United States Patent Office 3,495,257
Patented Feb. 10, 1970

---

3,495,257
METHOD FOR PREPARING TRIVINYL PHOSPHINE OXIDES
William J. Vullo, North Tonawanda, N.Y., assignor to Hooker Chemical Corporation, Niagara Falls, N.Y., a corporation of New York
No Drawing. Continuation-in-part of application Ser. No. 459,927, May 28, 1965. This application June 28, 1968, Ser. No. 740,854
Int. Cl. C07f 9/02
U.S. Cl. 260—606.5      7 Claims

ABSTRACT OF THE DISCLOSURE

A process for preparing trivinyl phosphine oxides by reacting a trivinyl phosphine with an aqueous dilute hydrogen peroxide solution at a temperature which is not in excess of about 100 degrees centigrade for a period sufficient to form the desired trivinylphosphine oxide, the hydrogen peroxide being present in an amount up to about 1.05 moles per mole of trivinylphosphine. The trivinyl phosphine oxides are useful for the modification of cellulosic materials to increase the resistance of such materials to shrinkage, burning and wrinkling.

---

This application is a continuation-in-part of co-pending application Ser. No. 459,927, filed May 28, 1965, and now abandoned.

This invention relates to a novel process for the production of trivinylphosphine oxides having the formula:

$$(CH_2=C)_3P=O$$
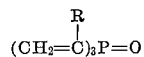

wherein each R is independently selected from the group consisting of hydrogen and lower alkyl radicals.

Trivinylphosphine oxides are valuable textile-treatment agents, improving wrinkle, flame and shrinkage resistance of natural or synthetic polymers which are capable of reaction with vinyl groups activated by attachment to meta-directing groups, such as cotton, linen, paper, rayon, wool and silk.

Alkyl phosphine oxides are known in the art. Chapter 6 of G. M. Kosolapoff's "Organophosphorus Compounds," Wiley and Sons, N.Y. 1958, discloses that trialkyl phosphines, from the highest to the lowest members, are readily oxidized to the corresponding phosphine oxides by exposure to air or to oxygen. Other methods such as oxidation of alkyl phosphines by reaction with nitric acid and aqueous potassium permanganate, have also been employed to produce trialkyl phosphine oxides. While these methods and others, such as reacting trialkyl phosphine with halogen with subsequent hydrolysis; reacting phosphorus oxychloride with Grignard reageants and the like result in the formation of the corresponding trialkyl phosphine oxides in relatively straight-forward reactions, these methods do not find equal success in the oxidation of trivinylphosphines to corresponding trivinylphosphine oxides. Attempts to employ such methods in the oxidation of trivinylphosphines to the corresponding trivinylphosphine oxides have produced less than satisfactory results. For example, attempts to produce trivinylphosphine oxide by air oxidation of the parent trivinylphosphine resulted in polymeric products having high melting points, indicative of cross-linking. Halogenation-hydrolysis of trivinylphosphine yielded no appreciable oxide product. Hydrogen peroxide oxidation, unless very carefully controlled, produced cross-linked polymeric products, The reaction of vinyl Grignard and vinyl lithium compounds with phosphorus trichloride also failed to yield trivinylphosphine oxide.

An object of the present invention is to provide a process for the oxidation of highly reactive trivinylphosphines to trivinylphosphine oxides in good yields and in a relatively simple and straight forward manner.

This and other objects of the invention will become apparent to those skilled in the art from the description of the invention which follows:

In accordance with the present invention, trivinylphosphines of the formula $$(CH_2=C)_3P$$
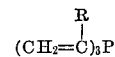

which may be synthesized by the reaction of vinyl Grignards with phosphorus trihalides or esters, wherein each R is independently selected from the group consisting of hydrogen and lower alkyl, i.e., one to four carbon atoms, are reacted at a temperature not in excess of about 100 degrees centigrade with dilute hydrogen peroxide in an amount of not more than about 1.05 moles of hydrogen peroxide per mole of trivinylphosphine present, to form trivinylphosphine oxides of the formula:

$$(CH_2=C)_3P=O$$
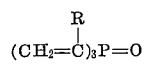

wherein R is as has been defined hereinabove.

While the reaction can be effected in an aqueous solcent system, preferably the reaction is conducted in the presence of an inert water-soluble organic cosolvent. Suitable cosolvents include acetone, tetrahydrofuran, dioxane, methyl ethyl ketone and the like. Where the reaction is conducted in the presence of a suitable organic cosolvent, the cosolvent can be employed in any desirable amounts. Conveniently, the cosolvent can be present in amounts of about 1.5–4 times the combined weight of the other components.

Temperatures not to exceed about 100 degrees centigrade are employed in the reaction. However, it has been found that the oxidation of the trivinylphosphine to the corresponding trivinylphosphine oxide proceeds quite smoothly at temperatures on the order of 35 to 55 degrees centigrade. It has also been determined that the reaction proceeds quite smoothly in a reaction system wherein air is excluded, e.g. under a nitrogen atmosphere.

Less than stoichiometric amounts of hydrogen peroxide to trivinylphosphine can be employed; however, in order to insure complete reaction of the trivinylphosphine present, a slight excess of hydrogen peroxide may be desired. For example, an excess of about .05 mole per mole of trivinylphosphine may be employed. Complete reaction of the phosphine is desirable since this avoids residual phosphine odor.

Following the reaction period, the trivinylphosphine oxide can be recovered by such techniques as distillation. A particularly advantageous method of recovery is one wherein a small amount, e.g. 0.01 to 1.0% by weight of a polymerization inhibitor such as hydroquinone is added to the product-solvent system, and the solvent is removed at temperatures below about 100 degrees centigrade. Further purification, if desired, can be achieved by sublimation.

Trivinylphosphine oxides being hygroscopic, the isolated products are then removed to dry, non-oxygen storage.

Typical, non-limiting examples of the compounds which may be prepared by the method of the present invention include: trivinylphosphine oxide; tri-1-methylvinylphosphine oxide (triisopropenylphosphine oxide); 1-methylvinyl di-1-butylvinylphosphine oxide; 1-methylvinyl-1-propylvinyl-1-butylvinylphosphine oxide; 1-butylvinyl di-1-methylvinylphosphine oxide; tri-1-butylvinylphosphine oxide. Preferred compounds of the present invention are those wherein $R_1$, $R_2$, and $R_3$ are each hydrogen or the same lower alkyl and preferably the compound trivinylphosphine oxide.

Textiles modified by treatment with the compounds of the present invention exhibit a marked increase in wrinkle resistance which is retained even after repeated laundering. No appreciable change is effected in the hand or feel of the materials. Further, the novel textile modifying agents described herein do not cause retention of chlorine in the treated fabric. Thus, loss of tensile strength, due to chlorine damage, a problem encountered with many known modifying agents, is avoided. In addition, the phosphorus atom of the present compounds imparts the property of flame resistance to the treated material.

Textile materials which may be modified by treatment with the compounds of the present invention include those comprising natural or synthetic polymers, or blends of the same, possessing functional groups, such as, hydroxyl, amine, amido, carboxyl, thiol, and the like, which are capable of reaction with vinyl groups activated by attachment to meta directing groups. Suitable polymeric materials include, for example, cellulosic materials such as cotton, linen, paper, rayon, and proteinaceous materials such as wool and silk. The compounds of the present invention are particularly effective for the modification of cellulosic materials to increase the resistance of such materials to shrinkage, burning and wrinkling. The textile materials may be in any convenient form such as fiber, thread, yarn, woven fabric, non-woven fabric or knitted fabric. At the time of treatment, the fabric may be in the unfinished state or it may have been previously bleached, dyed and/or printed or otherwise treated.

The modification of textile properties which may be achieved by treatment with compounds of the present invention apparently results from a crosslinking reaction wherein the vinyl phosphorus compounds of the present invention function as crosslinking agents reacting in the presence of a basic catalyst with the functional groups of the textile being treated. The reactivity of the vinyl groups is increased by their position adjacent to the meta directing P=O group. This reactivity is substantially the same when there is present in the compound a substituent, such as a lower alkyl radical of about one to four carbon atoms on the β-vinyl carbon, that is, the carbon atoms adjacent the phosphorus. However, reactivity may be lowered by the presence of substituents other than hydrogen on the β-vinyl carbon. The lower reactivity of such compounds may be due, at least in part, to steric hindrance. The lower order of reactivity of β-substituted trivinylphosphine oxides may also be due to the greater acidity of such compounds, relative to the α-substituted vinylphosphine oxides, resulting from a greater degree of resonant stabilization of the conjugate base. This greater acidity may result in partial or complete neutralization of the required basic catalyst as well as conversion of the phosphine oxide to a less reactive form, that is, the conjugate base, thereby interfering with the desired alkylation reaction.

The trivinylphosphine oxides may be applied to textile material in any suitable formulation, for example, as an emulsion or as a solution. Preferably the compound is formulated as an alkaline aqueous solution. However, if desired, an emulsion or a solution in a nonaqueous solvent, such as alcohol, acetone, dioxane, dimethylformamide, and the like, or a mixture of such nonaqueous solvent and water, may be employed. Such formulations may conveniently be applied by dipping, spraying, rolling or with the use of a textile pad or other suitable means. After application the excess may be removed by squeezing, centrifuging, pressing, etc., and, if desired, the material may be dried by any convenient method, such as in a forced air oven, under infrared lamps, or simply by evaporation in air at room temperature. The treated cloth is then cured by holding for a period of time which may vary from less than a minute at elevated temperatures, to several hours at room temperature.

A basic catalyst is employed to assist the reaction between the trivinylphosphine oxide and the textile material. The catalyst may be conveniently incorporated as a component of the treating formulation. Suitable basic catalysts include, for example, alkali metal and other suitable hydroxides, salts of a weak acid and a strong base, and quaternary ammonium hydroxides. More specifically, suitable catalysts include the alkali metal carbonates and bicarbonates, such as sodium or potassium carbonate and sodium or potassium bicarbonate, alkali metal hydroxide, alkali metal acetates, phosphates, and metasilicates, tetraalkylammonium hydroxides and other compounds which, when added to water, increase the pH to greater than 7.0.

To illustrate more fully the process of the present invention, the following non-limiting examples are set forth.

EXAMPLE 1

To a solution of 2.2 parts of trivinylphosphine in 20 parts of acetone was gradually added, with stirring, and under a nitrogen atmosphere, 10.3 parts of a solution of 6.8 percent by weight aqueous hydrogen peroxide. The rate of addition was controlled so as to maintain the reaction temperature in the range of 45–55 degrees centigrade, during the hydrogen peroxide addition. The reaction mixture was then heated for an additional 45 minutes after which aliquots were taken which gave a positive test for hydrogen peroxide (titanium sulfate test) and a negative test for trialkylphosphine (methyl iodide test). The reaction solution was then concentrated to dryness, yielding 2.2 parts of white solid product having a melting point of about 100 degrees centigrade. Sublimation of 0.5000 gram of this material at about 75 degrees centigrade and 0.25 millimeter of mercury gave 0.3936 gram of pure trivinyl phosphine oxide having a melting point of 98–100 degrees centigrade. Thus, the yield of pure trivinylphosphine oxide equaled 76 percent.

Calculated for $C_5H_9PO$: C, 56.25 percent; H, 7.08 percent; P, 24.18 percent. Found: C, 56.13 percent; H, 6.87 percent; P, 24.28 percent.

Results of analysis by infrared and proton magnetic resonance was consistant with the assigned structure.

EXAMPLE 2

Following the general procedure of Example 1, tri (1-methylvinyl) phosphine oxide is prepared by the addition of 50.5 parts of a 6.8 percent by weight hydrogen peroxide to a solution of 15.4 parts of tri (1-methylvinyl) phosphine in 300 parts of acetone.

EXAMPLE 3

A solution of 83 grams of trivinylphosphine in 250 milliliters of acetone was reacted with 80 grams of 31.6 percent by weight hydrogen peroxide in 150 milliliters of acetone, as in Example 1. Vacuum removal of solvents following addition of 0.25 gram of hydroquinone resulted in the recovery of a 75 percent yield of crude trivinylphosphine oxide as a moist white solid.

EXAMPLE 4

Following the general procedure of Example 3, 1-methylvinyl di-1-propylvinyl phosphine oxide is prepared by the reaction of 21.0 parts of 1-methylvinyl di-1-propylvinyl phosphine in 400 parts of acetone with 50.5 parts of a 6.8 percent by weight aqueous solution of hydrogen peroxide.

EXAMPLE 5

A swatch of bleached, desired, mercerized, 80 x 80 (threads per inch) cotton print cloth, weighing 3.1 ounces per square yard, was soaked in an aqueous solution containing 12.5 percent by weight of crude trivinylphosphine oxide and 6.25 percent by weight sodium carbonate and then was squeezed through the rolls of a laboratory textile padder to effect about an 80 percent wet pick-up. The swatch was then cured by heating for 10 minutes at 160 degrees centigrade in a forced air textile type of oven. The treated fabric was then hand washed in hot, soapy water, rinsed, pressed dry and flat, and equilibrated to laboratory conditions. The add-on, that is, the amount of trivinylphosphine oxide remaining as an integral chemical part of the textile material after curing and washing, to remove unreacted excess, was about 6.5 percent, based on the original dry weight of textile material. The wrinkle recovery angles, a measure of the ability of the material to recover from wrinkles, were determined. The wrinkle recovery angles (fill direction) were found to be 120 degrees, dry, and 116 degrees, wet, compared to 82 degrees, dry, and 84 degrees, wet, for an untreated control sample. In a test for flame resistance, thin strips of the treated fabric, held in a horizontal position, were ignited. After removal of the flame source, the flame went out and the strips were free from afterglow.

Following the general procedure of Examples 1 and 3, tri-1-propylvinylphosphine oxide is prepared by the reaction of tri-1-propylvinylphosphine and dilute hydrogen peroxide; tri-1-butylvinylphosphine oxide is prepared by the reaction of tri-1-butylvinylphosphine and dilute hydrogen peroxide; and 1-propylvinyl di-1-methylvinylphosphine oxide is prepared by the reaction of 1-propylvinyl di-1-methylvinylphosphine and dilute hydrogen peroxide. Following the general procedure of Example 5, these compounds, employed in place of the trivinylphosphine oxide, are also reacted with textile materials to produce improved wrinkle resistance.

Since certain changes in the process of this invention may be made without departing from the scope thereof, it is understood that the foregoing examples are illustrative and are not limiting.

What is claimed is:

1. A process for the production of trivinylphosphine oxides having the formula:

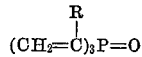

wherein each R is independently selected from the group consisting of hydrogen and lower alkyl radicals, which comprises reacting a trivinylphosphine having the formula:

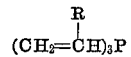

wherein R is as previously defined, with aqueous dilute hydrogen peroxide at a temperature not in excess of about 100 degrees centigrade, said hydrogen peroxide being present in amount of up to about 1.05 moles per mole of trivinylphosphine, for a period of time to essentially convert the trivinylphosphine present to the corresponding trivinylphosphine oxide, and subsequently recovering the trivinylphosphine oxide product.

2. A process as defined in claim 1 wherein the oxidation is conducted in the presence of an organic cosolvent, nonreactive under the prevailing reaction conditions.

3. A process as defined in claim 2 wherein the organic cosolvent is acetone.

4. A process as defined in claim 1 wherein recovery of the trivinylphosphine oxide is effected by the addition to the reaction mixture of a polymerization inhibitor prior to separation of the trivinylphosphine oxide from the reaction mixture.

5. A process as defined in claim 4 wherein the polymerization inhibitor is hydroquinone.

6. A process as defined in claim 4 wherein the polymerization inhibitor is present in an amount of from about 0.01 to about 1.0 percent by weight, based on the weights of the trivinylphosphine oxide.

7. A process for the production of trivinylphosphine oxides having the formula:

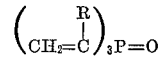

wherein each R is independently selected from the group consisting of hydrogen and lower alkyl radicals, which comprises reacting in an inert atmosphere a trivinylphosphine having the formula:

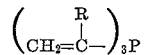

wherein R is as previously defined, with aqueous dilute hydrogen peroxide, said hydrogen peroxide present in an amount of up to about 1.05 moles per mole of trivinylphosphine, at a temperature of from about 35–55 degrees centigrade and in the presence of an inert organic solvent for a period of time to essentially convert the phosphine present to the corresponding phosphine oxide, adding hydroquinone to the reaction mixture in an amount of from about 0.01 to about 1.0 percent by weight based on the weight of the trivinylphosphine formed, and thereafter recovering the trivinylphosphine oxide by distillation at temperatures not in excess of about 100 degrees centigrade.

References Cited

UNITED STATES PATENTS

| 3,009,897 | 11/1961 | Ludington et al. | 260—606.5 X |
| 3,304,330 | 2/1967 | Yoke et al. | 260—606.5 |
| 3,271,460 | 9/1966 | Garner | 260—606.5 |
| 3,048,638 | 8/1962 | Foster | 260—606.5 |

DELBERT E. GANTZ, Primary Examiner

WERTEN F. W. BELLAMY, Assistant Examiner